US008589308B1

(12) United States Patent
Bender

(10) Patent No.: US 8,589,308 B1
(45) Date of Patent: *Nov. 19, 2013

(54) GRANT MANAGEMENT SYSTEM AND METHOD

(75) Inventor: Andreas J. Bender, Bronxville, NY (US)

(73) Assignee: Polaris Solutions, LLC, New York, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/022,173

(22) Filed: Feb. 7, 2011

Related U.S. Application Data

(63) Continuation of application No. 11/589,934, filed on Oct. 31, 2006, now Pat. No. 7,885,900.

(51) Int. Cl.
*G06Q 99/00* (2006.01)

(52) U.S. Cl.
USPC ........................................................ 705/317

(58) Field of Classification Search
USPC ........................................................ 705/317
See application file for complete search history.

(56) References Cited

U.S. PATENT DOCUMENTS

| | | | |
|---|---|---|---|
| 7,043,454 | B2 | 5/2006 | Powell |
| 7,885,900 | B1 | 2/2011 | Bender |
| 2001/0011222 | A1 | 8/2001 | McLauchlin et al. |
| 2002/0120538 | A1 | 8/2002 | Corrie et al. |
| 2004/0078313 | A1 | 4/2004 | Brouillette et al. |
| 2004/0193630 | A1 | 9/2004 | McLauchlin |
| 2005/0192826 | A1 | 9/2005 | Kanefsky |

FOREIGN PATENT DOCUMENTS

| | | |
|---|---|---|
| WO | WO 01/69485 | 9/2001 |
| WO | WO 2005/022313 | 3/2005 |

OTHER PUBLICATIONS

Michigan Department of Education Michigan Electronic Grants System (MEGS) http://www.intelligrant.com/cs_mi_megs.asp.
An integrated approach to electronic research administration http://hsc.unm.edu/research/infoed/documentation/HS_Overview.pdf.
WebGrant$^T$ complete eGrants Solution http://www.dullestech.com/webGrants.html.
Web-based solution for grant seeking organizations http://www.bamboosolutions.com/documents/Grantee_flyer.pdf.
Web-based Education Grant Workflow Application: Case Study http://www.avalontechnologies.co.th/assets/GrantApplication-CaseStudy.pdf.
Pharmaceutical Grants and compliance http://www.exlpharma.com/events.ev_agenda.php?ev_id=41.

(Continued)

*Primary Examiner* — Traci Casler
(74) *Attorney, Agent, or Firm* — Sterne, Kessler, Goldstein & Fox P.L.L.C.

(57) ABSTRACT

A web-based grant management application and method is described. Registration information pertaining to a grant requestor is received at a web-based portal. A local, computer readable compliance database is maintained. The compliance database includes an exclusion list of grant requestors that have been excluded from receiving a grant. The grant management application determines an exclusion status for the grant requestor by comparing the registration information to the exclusion list. The grant requestor is informed of its exclusion status via the web-based portal. If the grant requestor's exclusion status is satisfactory, then the web-based portal receives grant information pertaining to a grant sought. Based on the grant information and the registration information, a custom set of business rules is derived to automatically manage the receipt, review, tracking, reconciliation and analysis of the grant sought. The business rules are implemented by a grant management application coupled to the web-based portal.

31 Claims, 15 Drawing Sheets

(56) References Cited

Figure 1:
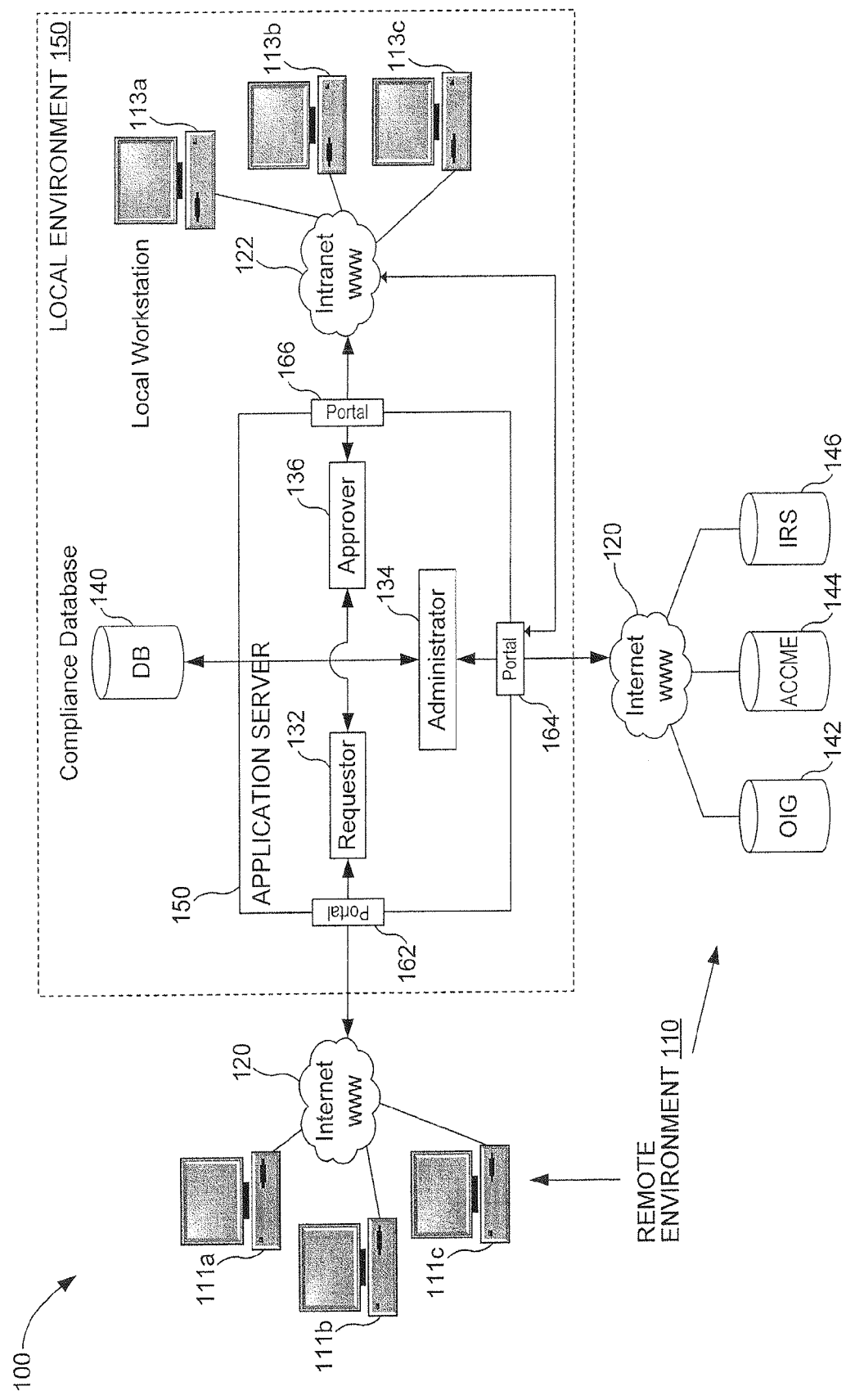

OTHER PUBLICATIONS www.oig.hhs.gov; retrieved from www.archive.org any linkage May 5, 2005.

"ACCME's Essential Areas and their elements" Jul. 2006, ACCME's Guidelines.

www.ig.hhs.gov; retrieved from www.archive.org any linkage May 7, 2005.

FIG. 2B

[SPONSOR logo]

My Grants

FAQ | Help | Privacy Policy | Contact | Profile | Log out

Welcome, John Doe

Welcome, John Doe, to your Sponsor Grants Homepage!

Reviewing Educational Grant Status

In your "inbox" below, you can view the status of all grants submitted to date. The status of each grant is updated regularly. If you need clarification on a status step, please click on the "what's this?" icon next to the status bar.

Submitting an Educational Grant

When submitting a grant request, you will be directed through the electronic grant process via instructions and help options. Please make sure that you complete each required field. Should the review team need additional information, you will receive notification from Sponsor via e-mail. Please note that all correspondence regarding your grant request will be sent to the e-mail address provided upon registration.

All educational grant requests that are submitted will be reviewed. However, please understand that submission of a grant request does not guarantee approval for funding by Sponsor. You will be notified via e-mail of Sponsor's intent to provide financial support for your program, which is contingent upon acceptance of the Letter of Agreement (LOA).

Thank you for your consideration of Sponsor for your quality educational initiatives.

Submit New Request — 264

My Grants — 262
Displaying 1 - 2 of 2 Grants

| Grant ID | Date Submitted | Status | ? | Program Title | ? |
|---|---|---|---|---|---|
| 000107 | Jun 07, 2006 | closed | | title | |
| 000108 | | not submitted | | | Please Complete Grant Request |

? Move mouse over icon to view a description of the item

¹ Grants submitted within last 365 days

Show [10 ▼] items per page

Page 1 of 1
<Previous Next>
▲ Go to top

Terms & Conditions | Privacy Policy | Copyright Sponsor

GRANT MANAGEMENT SYSTEM AND METHOD

CROSS-REFERENCE TO RELATED APPLICATIONS

This is a continuation of U.S. application Ser. No. 11/589,934, filed Oct. 31, 2006, which will issue as U.S. Pat. No. 7,885,900 on Feb. 8, 2011, which is incorporated herein by reference.

BACKGROUND OF THE INVENTION

1. Field of the Invention

The invention relates generally to the field of automated grant management systems. In particular, the invention relates to a grant management system in the pharmaceutical, biotechnology and life sciences industry.

2. Background

Every year pharmaceutical, biotechnology and other life science companies process and manage thousands of grants provided to individual and institutional applicants. The average top 10 pharmaceutical company spends between $50 and 150 million in grant funding per year. The total market for pharmaceutical grants is estimated to be between $3 and 4 billion. Common grants in life sciences industry include continuing medical education (CME) grants, fellowship grants, sales and marketing grants, sponsorships, charitable contributions, research grants, publication grants, investigator-initiated research proposals (IIRP) and patient education grants. In an IIRP grant, physicians or other healthcare professionals often approach pharmaceutical companies with ideas for research or training using pharmaceutical compounds. In a CME grant, physicians and medical schools often request funding to develop and provide continuing medical education to health care professionals (e.g., physicians, pharmacists and nurse practitioners, etc.). IIRP, CME, charitable and other such grant proposals necessarily go through a process of submission, approval, execution and reconciliation phases.

Management by granting agencies of such grants is not a trivial process, especially considering the numerous procedural and regulatory requirements mandated by governmental agencies. For example, the Office of the Inspector General (OIG) for the Department of Health and Human Services publishes a list of those entities that are excluded from receiving grants. Similarly, private accrediting agencies such as the Accreditation Council for Continuing Medical Education (ACCME) also play a role in the life sciences industry in by establishing voluntary accreditation standards. Still further, other regulatory agencies, and even Congress itself, often impose temporary or permanent requirements on life sciences companies in allocating grants.

In addition, numerous different people within the granting organization or commercial sponsor may play a role in grant approval and management. For example, in a pharmaceutical company, Medical Education Team Members, Legal Staff, Ethics & Compliance Staff, Regional Scientific Directors, Medical Directors, Clinical Research Scientists, Clinical Research Managers, Brand Directors, IIRP Coordinators, Contract Managers, etc. may all participate in the grant process.

Conventional grant management still relies heavily on paper proposals and applications, and review procedures are often onerous and inefficient. In addition, conventional systems lack the ability to efficiently produce accurate audit reports similar to those periodically requested by the US government. These error prone processes require a considerable amount of time from multiple resources within the granting organization or commercial sponsor. Existing automated grant management applications still lack key features important to the life science industry. Given the recent advances in web-based business solutions, a need has arisen for entities involved in procuring and granting life science related grants for a grant management system that allows a granting organization or commercial sponsor to receive, review, track, reconcile, analyze and generate reports pertaining to life science related grants through their lifecycle, from grant requestor registration and pre-screening through grant reconciliation and auditing.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 illustrates an exemplary system in which the described embodiments may operate.

Figure 2A:
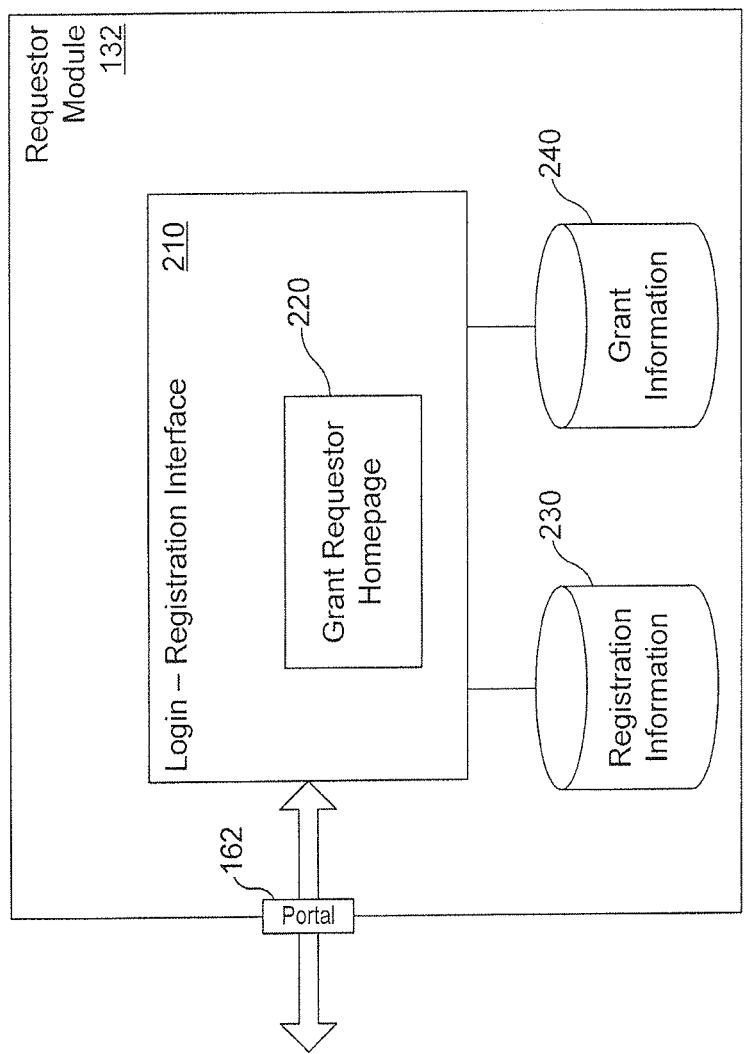
Figure 2B:
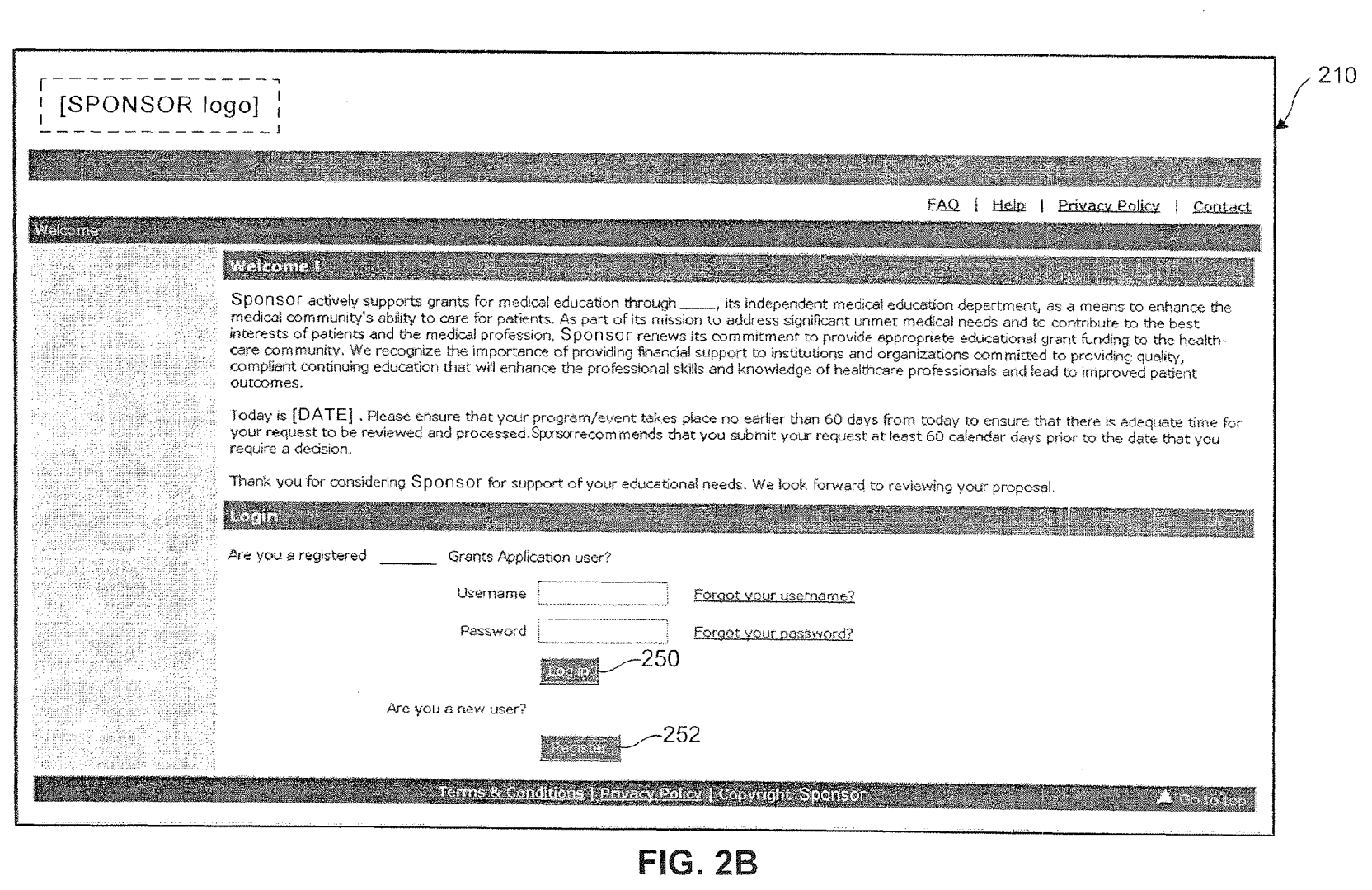

FIGS. 2A-C illustrate an exemplary requestor module.

Figure 3A:
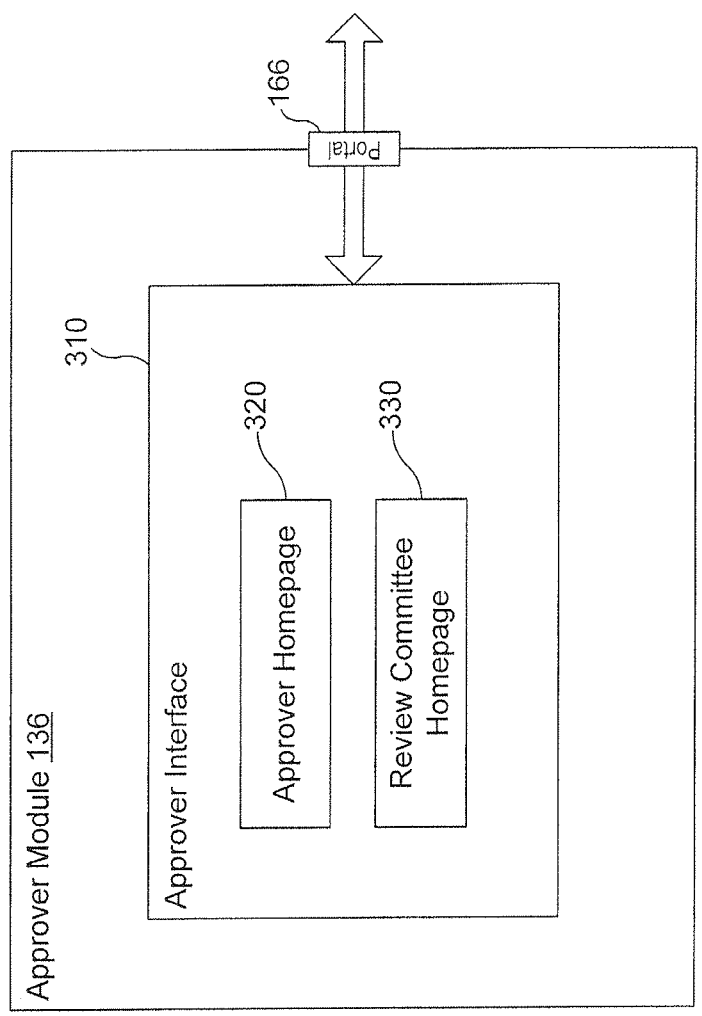
Figure 3B:
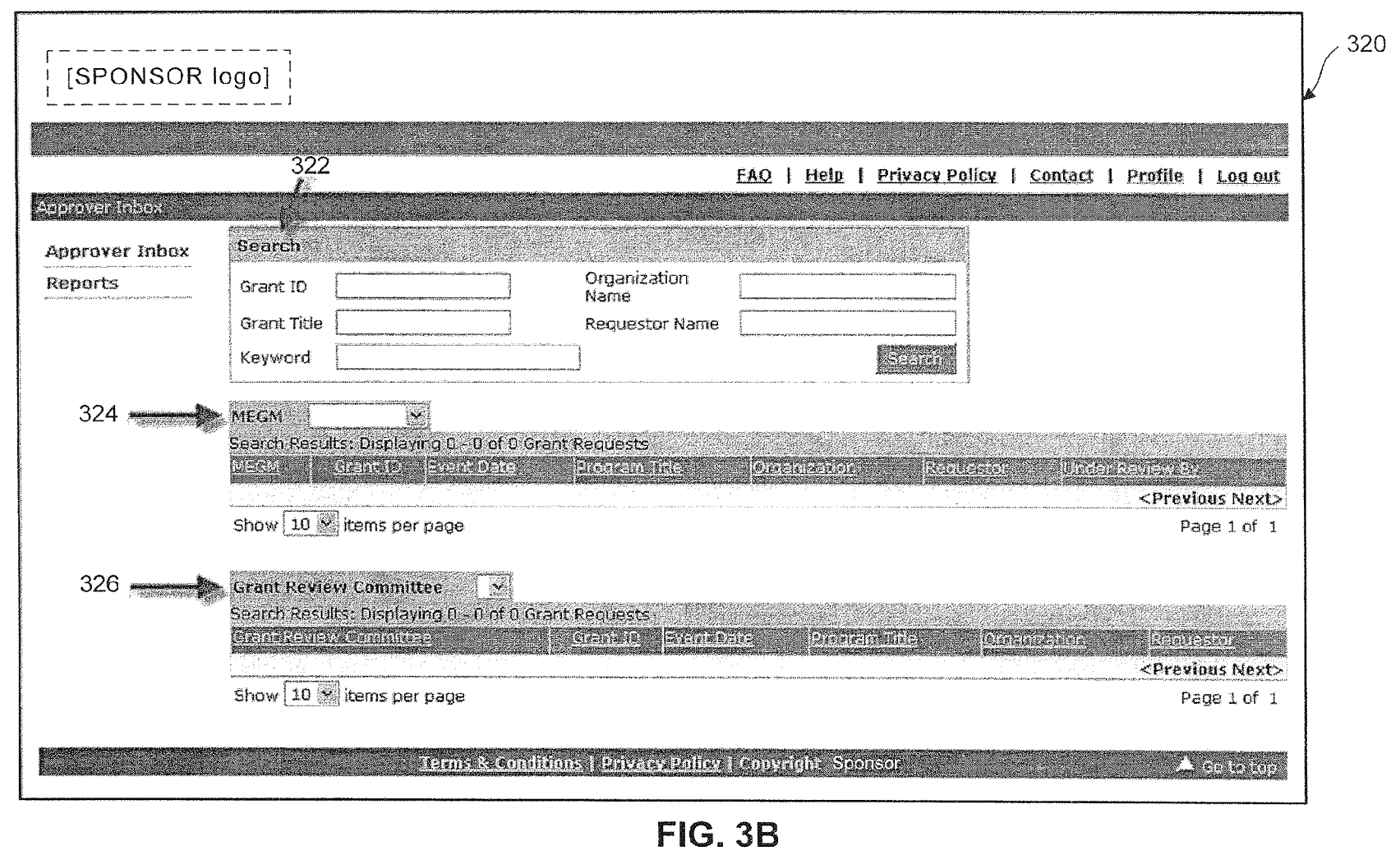

FIGS. 3A-B illustrate an exemplary approver module

FIGS. 4A-F illustrate an exemplary administrator module

Figure 5A:
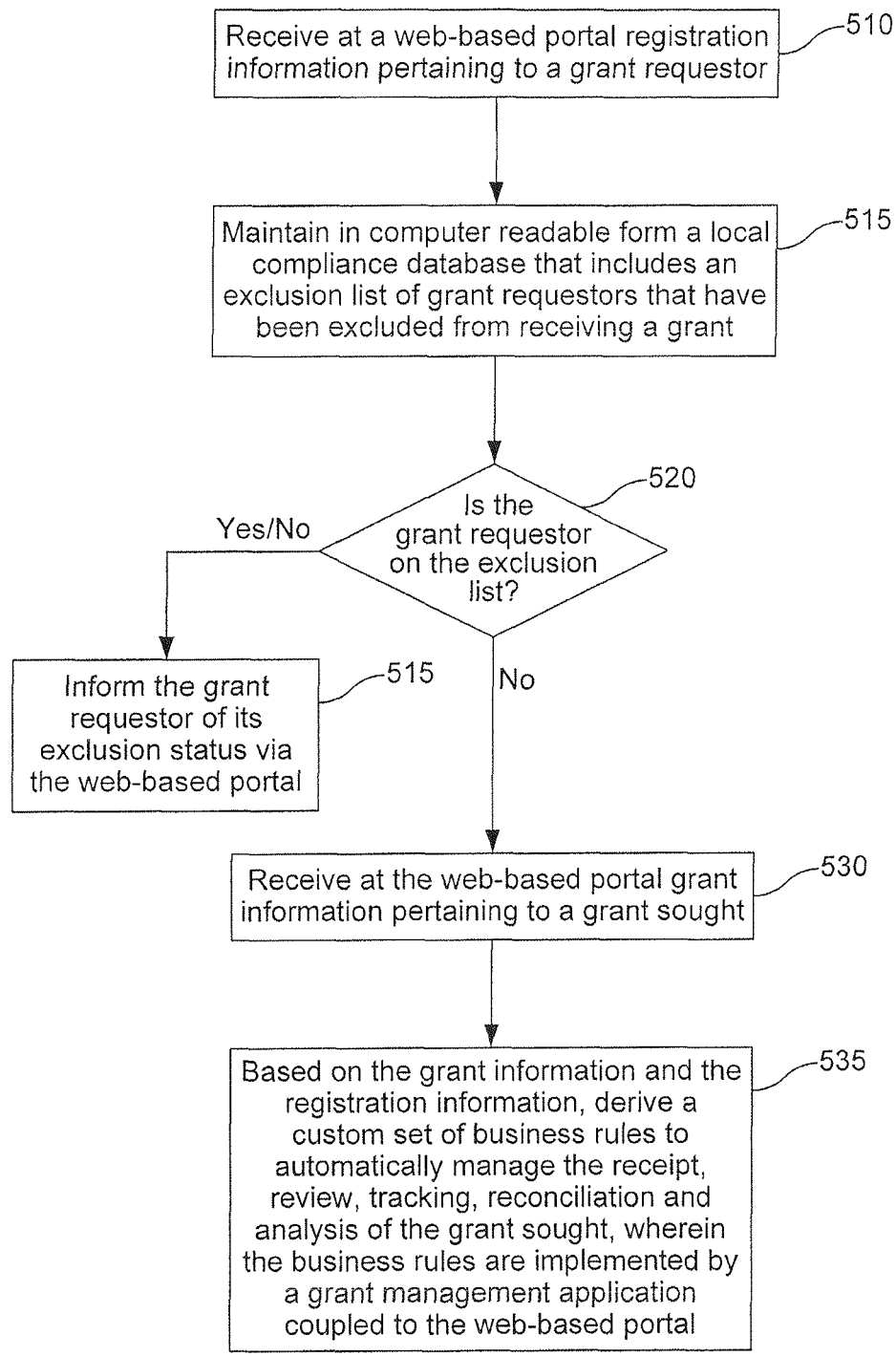
Figure 5B:
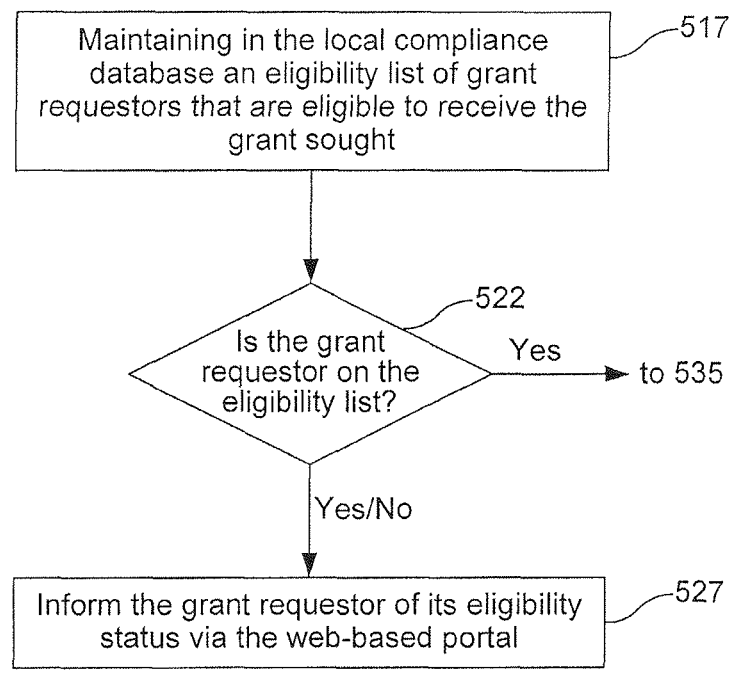

FIGS. 5A-B is a flowchart illustrating an exemplary grant management method.

Figure 6:
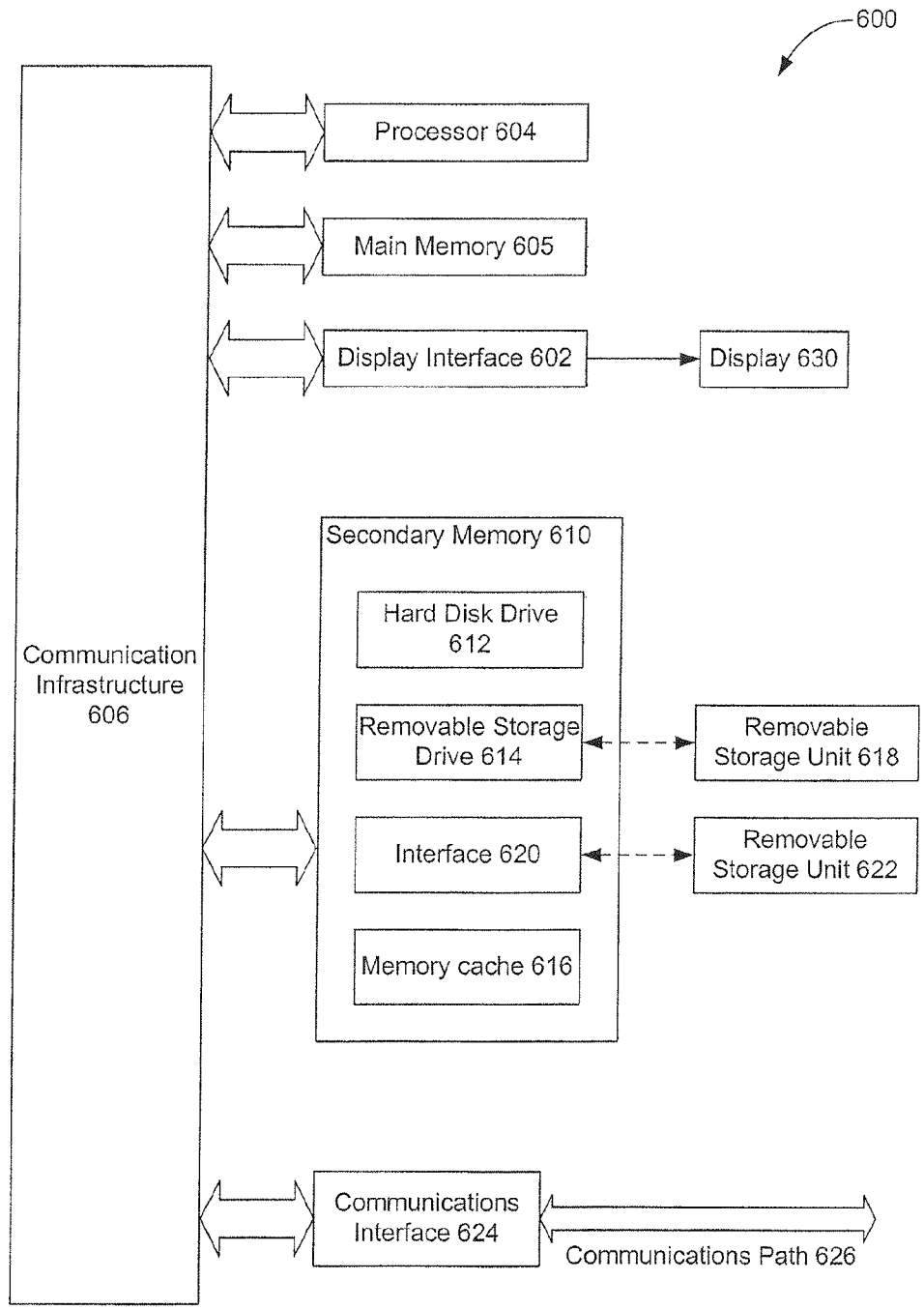

FIG. 6 illustrates computer architecture for implementing the present invention.

The present invention will now be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

I. Introduction

A web-based grant management application supports the submission, routing, approval, tracking, reconciling and auditing of grant requests made to pharmaceutical, biotechnology and other life science companies. An embodiment of the invention provides web-based portals coupled to an application server wherein the grant requestor/grantee, granting organization or commercial sponsor and authorized third-parties can navigate the grant process in view of various industry specific government mandated requirements and regulations, as well as required internal processes and policies. The web-based portals permit a wide variety of local and remotely involved parties to access a centralized, server supported, grant management application. Specific details are described more fully below.

II. Exemplary Environment

Before describing embodiments of the grant management application in detail, an exemplary environment in which the claimed system and methods may be implemented is described. FIG. 1 illustrates a local environment 150 and a remote environment 110 in which the grant management application operates. Included in the local environment is an application server 130. The application server 130 includes a plurality of functional modules that work together to implement the grant management application—i.e., a requestor module 132, an approver module 136 and an administrator module 134. The operation of these functional modules is described more fully below in separate sections.

As is known in the art, a server is a computer system in a network that is shared by multiple users. Servers come in all sizes from x86-based PCs to IBM mainframes. A server may have a keyboard, monitor and mouse directly attached, or one keyboard, monitor and mouse may connect to any number of servers via a KVM switch. Servers may be also be accessed through a network connection as well. Stand-alone PCs and Macs can also function as a server to other users on the network even though they serve as a single workstation to one user—e.g., in a peer-to-peer network.

The term server may refer to both the hardware and software (the entire computer system) or just the software that performs the service. For example, Web server may refer to the Web server software in a computer that also runs other applications, or, it may refer to a computer system dedicated only to the Web server application. For example, a large Web site could have several dedicated Web servers or one very large Web server.

Servers are sometimes classified by their purpose. An application server, for instance, refers to software in an intranet/Internet environment that hosts a variety of language systems used to program database queries and/or general business processing. These scripts and services, such as JavaScript and Java server pages (JSPs), typically access a database to retrieve up-to-date data that is presented to users via their browsers or client applications. The application server may reside in the same computer as the Web server (HTTP server) or be in a separate computer. In large sites, multiple computers are used for both application servers and Web servers (HTTP servers). Examples of Web application servers include BEA Weblogic Enterprise, Borland AppServer and IBM's WebSphere Application Server.

The application server 130 illustrated in FIG. 1 includes a plurality of communication portals or interfaces through which the functional modules interact with authorized users in a remote environment 110. For example, web-based portal 162 acts as an interface between external users such as grant requestors and the requestor module 132. Similarly, communication portal 164 acts as an interface between external users such as outside accrediting agencies—e.g., the OIG 142, the ACCME 144 or the Internal Revenue Service (IRS) 146. These web-based communication portals typically have one or more uniform resource locators (URLs) through which they interface with users via the Internet or the World Wide Web 120. Users—e.g., a grant requestor—can implement a plurality of user devices such a desktop or portable computers 111*a-c* to interface with the grant management application. The web-based communication portals are therefore capable of implementing a variety of common communication protocols such as TCP/IP, SPX/IPX, HTTP, STMP, FTP, etc. One skilled in the art could readily use such protocols to implement the grant management application described herein.

The application server 130 may also be coupled to various entities in a local environment 150 such as local compliance database 140 and an intranet 125. The local compliance database 140 and intranet 125 are typically managed by the granting organization or commercial sponsor—e.g., a pharmaceutical company. Various users in the granting organization or commercial sponsor can communicate with the application server through local workstations 113*a-c*. The intranet 125 can be embodied in a LAN, WAN, or other similar architecture.

The described system 100 is merely exemplary and could include other features and configurations not shown. FIG. 1 is not intended to be limiting outside the scope of the appended claims. Indeed, one skilled in the art will recognize the numerous different features and combinations that could be employed without departing from the scope and spirit of the claims. For instance, local users such as granting organization or commercial sponsor employees are not restricted to accessing the described grant management application via the local intranet, but could also access the grant management application via remote locations using a dedicated URL for authorized remote users.

The following sections illustrate in more detail the three basic functional modules included in the grant management application—i.e., the requestor module 132, the approver module 136, and the administrator module 134. In general, however, grant requestors or grantees use the requestor module 132 to create an on-line profile, enter/upload requested registration and grant information, and track the status of both grant requests and approved grants. Granting agencies use the approver module 136 for tracking requests and managing approval decisions. The administrator module 134 performs and directs much of the automated features in the described grant management application through the development of custom sets of business rules. The business rules allow, for example, automated database verification, internal and external user and account management, user administration/roster maintenance, approval/review committee definition, standard management reporting, automated communication with editing capability (e.g., via auto-emails), budget entry and tracking, document retention, and document upload capability into requestors' files.

III. Grant Management Application—Description of Functional Modules

A. Grant Requestor Module

FIG. 2A illustrates in more detail the requestor module 132. As illustrated, the requestor modules provides an interface for the grant requestor or grantee to communicate with the grant management application and vice versa. For example, as noted above, grant requestors interface with the requestor module 132 to create on-line profiles, request and manage grant requests, and manage and track approved grants. Grant requestors or grantees access the grant management application through the web-based portal 162.

In addition to the user interface functions, the requestor module 132 also supports and maintains a registration information database 230 and a grant information database 240. The combined registration and grant information make up an on-line user profile.

Registration Interface

A grant requestor or grantee wishing to use the grant management application will first see a registration/login interface upon accessing the appropriate URL via the web-based portal 162. An exemplary login graphic user interface (GUI) 210 is illustrated in FIG. 2B. If the grant requestor is a first time user, the grant requestor will click on the registration button 252 and will automatically be prompted for registration information. If the grant requestor is already a registered user, then username and password fields are supplied along with a login button 250.

Registration information relates to the grant requestor or applicant. Exemplary registration information is illustrated in Table 1. The registration interface thus allows online registration of grant applicants or requestors via, for example, web-based portal 162.

TABLE 1

| Field | Description |
|---|---|
| Organization Legal Name | Enter your organization's legal name as registered with the Internal Revenue Service (IRS). Example: Commercial Supporter, Inc. |
| Tax ID | Enter your Employer Identification Number (EIN), as assigned by the Internal Revenue Service (IRS). Note that at this time, Commercial Supporter does not accept grant submissions from individuals without ties to an Organization recognized by the IRS. |
| Tax Status | Select the tax status from the dropdown list that matches your Organization exactly. If your status is not listed select "Other." |
| Contact: First Name | Enter your first name in this field. |
| Contact: Last Name | Enter your last name in this field. |
| Contact - Title | Select your title from the list. |
| Address, City, State, Zip | Enter your company's address in the following address fields. Include your department if applicable. |
| Primary Phone | Enter the phone number you can be reached at. Include your extension if applicable. |
| Secondary Phone | Enter a second number where you can be reached. Include your extension if applicable. |
| Fax | Enter your fax number. |
| E-mail | Enter your e-mail address. |
| Username | Enter a username to be used for logging in to the Commercial Supporter Grants website. It must be between 6-10 alphanumeric characters. |
| Password | Enter a password to be used for logging in to the Commercial Supporter Grants website. It must be between 8-12 alphanumeric characters. |
| Verify Password | Retype your chosen password in this field. |
| Accreditation | Applicable accreditations include those from medically related Organizations or societies. If your Continuing Medical Education Accrediting bodies are not listed please provide the full name of the accrediting bodies in addition to any relevant acronyms. |
| State Affiliation | Indicate whether your organization is affiliated with a state organization |

Based on the registration information, the grant management application determines an exclusion status for the grant requestor. To do so, the grant management application compares the registration information 230 provided by the grant requestor to the exclusion list in the local compliance database 140. The exclusion list includes those grant requestors that have been excluded from receiving a grant. A satisfactory exclusion status results where the grant requestor is not included in the exclusion list. A grant requestor is informed of its exclusion status via the web-based portal 162. Details of the local compliance database 140 and the exclusion list contained therein are described more fully below.

When a grant requestor or grantee is registered, the grant requestor or grantee will have their own homepage. An exemplary graphic user interface (GUI) for a grant requestor/grantee homepage 220 is illustrated in FIG. 2C. As illustrated, the grant requestor GUI 220 includes an inbox labeled "My Grants" 262 and a button for submitting a new request 264. At the "My Grants" inbox 262, the grant requestor/grantee can view the status of currently pending grants and grant applications.

Grant Information Interface

As described above, once a grant requestor is registered, a new grant may be requested. When the "Submit New Request" button 262 is activated, the grant requestor is then automatically prompted for grant information. As the name implies, grant information relates to the grant being sought. Exemplary grant information is illustrated below in Table 2.

TABLE 2

| Field | Description |
|---|---|
| Program Type | Choose your Program Type from the list. |
| Therapeutic Area | Choose the Therapeutic Area from the list. |
| Program Title | Enter the name of your program. |
| Start Date | Enter the start date of your program. For enduring materials, enter release date. Note that grant requests should be submitted a minimum of 60 days' prior to when a decision is needed to make the appropriate preparations. |
| End Date | Enter the end date of your program. For enduring materials, enter expiration date. |
| Needs Assessment Summary | Provide a summary of data supporting the need for your educational program. If you would like to submit a full length Needs Assessment, you will have the opportunity to upload it in the supporting documents section of this grant request. Depending on the requested amount, this may be required. |
| Learning Objectives | Provide an overview of your program's purpose, including educational objectives. |
| Program/Event Description | Provide a description of all educational activities, including (if applicable) a program agenda, invited speakers, topics, dissemination strategy, and marketing strategy. If request encompasses multiple programs please describe. |
| Exhibit Opportunity | Is there an exhibit/display opportunity at this program? |
| Invitation Distribution Help | Will you be requesting Commercial supporter's assistance with secondary distribution of invitations? If yes, you will be prompted to upload sample invitation and invitation assistance request letter. |
| Checks Payable To | Enter the name of the payee organization. This must match the W9 form. |
| Payment Address | Enter the address of the organization to which checks must sent. This must match the W9 form. |

The grant registration information and the registration interface also allow a grant requestor or grantee to upload documents via the web-based portal. Uploaded documents and other data are stored in an online profile and may be used in subsequent grant requests, as applicable. For example, applicants are able to upload into an online profile an address, name, tax id and W9 forms required for the application. This profile is saved and may be used for future applications. The grant management application may also automatically request annual updates of the profile, in order to ensure up-to-date information. The online profile is accessible to grant requestors through the web-based portal 162 and allows grant requestors to manage current and past grant requests and obtain status of their applications. Grant requestors can save their progress on current grant requests and come back later to edit them before submission The requestor module may also flag actions that need to be taken by the grant requestor as a next step. For example, the requestor module may prompt the grant requestor to sign the Letter of Agreement or to reconcile a grant. A status GUI on the grant requestor homepage will outline the required action. The action may be hyperlinked, so that the grant requestor can click on the link to get to the part of the application where information for the next action is required. The grant management application may send automated email messages to the requestor, asking the requestor for the required information and to log onto the grant requestor homepage 220.

As illustrated in FIG. 2C, grant status information is also included on the grant requestor homepage 220. Exemplary information is illustrated in Table 3.

TABLE 3

| Status | Description |
|---|---|
| Not Submitted | Complete the necessary Grant Request Forms by clicking on the "Please Complete Grant Request" link. |
| Review | Your Grant Request is being reviewed by Commercial supporter and you will be notified of Approval, Rejection, or a Request for Additional Information. |
| Additional Information Required | Your Grant has been reviewed, but more information is needed before a decision can be made. Please provide the requested information. |
| Approved | Your Grant Request has been approved. You will be sent an LOA to be signed and returned to GNE. |
| Pending Reconciliation | Your event has been approved, and there is nothing else you need to do until your event has been completed. At that time, you will be required to Reconcile the Budget and Attendance (See Actions Table). |
| Rejected | Your Grant Request was not approved. |

Intake and Pre-Screening Function

Collection of registration and grant information serves the dual function of enabling both the intake and pre-screening of grant requestors for the grant sought. Exemplary functions of the intake and pre-screening process include ensuring all forms and templates are filled out; ensuring the application complies with formats and protocols including individual company standards and industry practice standards; and supporting of submission of documentation required for grant applications. In an embodiment, the requestor module 132 enables paperless submission of grant applications, with electronic signatures on key documents and an electronic completeness review.

In a further embodiment, intake (i.e., receipt of registration information or grant information) may be based on unique access code. For example, although the grant requestor has been prescreened and is eligible to submit a grant, certain sensitive or confidential grants can only be submitted after the pharmaceutical company provides a unique access code to the grant requestor. This code can only be used once, within a certain time frame, for a certain grant request type. In an embodiment, this is done for IIRP requests. In this embodiment, the individual requestor may be prescreened by email or phone, and given a unique code that can only be used once.

With the registration and/or grant information available and stored in respective databases 230 and 240, an on-line profile is formed. The granting organization or commercial sponsor can then begin the grant review and approval processes. This is accomplished, in part, with the approver module 136, which is described more fully below. Similarly, the grant management application can begin to develop a custom set of business rules that automatically manage the receipt, review, tracking, reconciliation and analysis of the grant sought. The business rules are developed with the administration module 134, which is described more fully below.

B. Approver Module

FIG. 3A illustrates in more detail the approver module 136. As illustrated, the approver module provides an interface for the granting organization or commercial sponsor to communicate with the grant management application and vice versa. As noted above, a plurality of persons associated with the granting organization or commercial sponsor may be involved in the grant approval processes. The approver module provides a plurality of GUIs for such authorized users.

Approver Interfaces

Much of the interaction between those tasked with approving grants and the grant management application is through an approver home page. An exemplary approver homepage 320 is illustrated in FIG. 3B. The approver homepage 320 can provide a plurality of GUIs for the various persons having a role in the grant approval process. For example, homepage 320 has a search interface 322, a management interface 324 and a grant review committee interface 326. Other interfaces or even homepages could be developed as necessary for other authorized parties. For example, a grant review committee may have their own homepage 330 through which they can track and manage ongoing review and approval efforts.

Exclusion and Eligibility Status

As described briefly above, before a grant application is fully processed by the grant management application, an initial screening is accomplished for both exclusion and eligibility. This initial screening prevents wasted resources where a grant requestor has been excluded from receiving a grant (exclusion determination), or where the grant requestor is ineligible to apply of the particular type of grant sought (eligibility determination). If either of these conditions are not satisfied, it makes little sense to proceed further into the grant application process.

To accomplish this initial screening, the grant management application is coupled to and maintains a local compliance database 140. The local compliance database 140 includes both exclusion and eligibility lists. The exclusion list includes, for example, grant requestors that have been excluded by the OIG for the Department of Health and Human Services from receiving publicly funded grants. As described more fully below, the administrator module 134 is responsible for locally maintaining an updated exclusion list in the local compliance database 140. The granting organization or commercial sponsor may also have an internal exclusion list that may be integrated with the exclusion list in the local compliance database 140.

The eligibility list similarly integrates various public and proprietary databases. Whereas the exclusion status of a grant request rests primarily on the registration information, the eligibility status rests primarily on the grant information. In other words, whether a grant requestor satisfies the eligibility test depends on the type of grant sought. For instance, a charitable contribution would require the grant requestor to be checked against the IRS database of charitable organizations, while a CME grant would require the grant requestor to be checked against the ACCME eligibility list. To determine eligibility, applicants are thus matched against the eligibility lists in the local compliance database 140, depending on the type of grant sought. The granting organization or commercial sponsor may also have an internal eligibility list that may be integrated with the eligibility list in the local compliance database.

Verification checks against the local compliance database 140 are made several times to prevent payment of grant funds to unauthorized (i.e., excluded or not eligible) grant requestors. In an embodiment, eligibility and exclusion checks are thus accomplished during initial registration, after approval, and just before grant payments are actually made.

Review and Approval

Once the initial exclusion and eligibility status checks are satisfied, other approval and compliance checks can be developed and assessed depending on the registration and grant information. To accomplish this, the approver module 136 cooperates with the requestor module 132 to ask for and receive necessary information from the grant requestor. For instance, in the event that a grant request is incomplete, the approver module 134 implements a business rule asking for additional information from the requestor, all electronically. Table 4 illustrates some exemplary actions that may be requested by the approver module 136.

TABLE 4

| Action | Description |
|---|---|
| Please Complete Grant Request | You have started to fill out the Grant Request Form, but have not completed it. Click here to finish the Grant Request Form. |
| Please Submit Additional Information | Your Grant has been reviewed, but more information is needed before a decision can be made. Please provide the requested information. |
| Please Submit LOA | Your Grant Request has been approved. Click on this link to access the LOA. After reviewing the LOA click on Accept to indicate your acceptance and return the LOA |
| Please Reconcile Budget and Attendance | Your event has already taken place. At this point you need to fill out the Reconciliation Forms for Budget and Attendance. |

The approver module 136 thus facilitates review and approval of grant applications in a number of ways. For example, the approver module may determine its review and approval criteria based on the granting organization or commercial sponsor's predefined strategic priorities and educational objectives. Review and approval criteria may also depend on the type and the size of the grant.

The approver module 136 is also responsible for proper routing of the grant application. Based on registration and grant information, the approver module 136 determines the grant type that the requestor is submitting, and determines the approval flow that the application will follow. Routing can be customized by, for example, grant type or therapeutic area. Routing may be sequential, parallel or any combination thereof. Automated reminder emails, escalation emails, and statuses are configurable based on milestones/events.

In a embodiment, where a grant is below a certain funding amount, the grant may be instantly reviewed and approved by one person. In another embodiment, the granting organization or commercial sponsor's legal department may be provided the opportunity to review grant application compliance with applicable federal and state laws. In another embodiment, internal approval metrics may also be devised, such as a rule banning submission of grant requests until prior grant funding has been reconciled, and all required documentation of prior grants has been uploaded. In sum, many different review approval processes may be developed and followed depending on the registration and grant information received and stored by the requestor module 132.

The final act of approval often involves the signing of a letter of agreement (LOA) between the parties. Currently, a paper LOA is sent back and forth between the granting organization or sponsor and grant requestor for review and signature. This process takes a significant amount of time and can be very inefficient. Indeed, many grant requests fail due to lack of follow-up on the LOA. In yet a further embodiment, the approver module enables an LOA to be signed electronically. This feature allows the LOA to be electronically signed by the granting organization, the grant requestor and, if necessary, a third party.

After a request is approved by the granting organization, the grant requestor receives an email directing them to return to the system to review and sign the LOA. The grant requestor reviews the LOA via the web-based portal and signifies approval by clicking on an approval button. At this point, the requestors IP address, username, date and time stamp, and the exact LOA that was displayed is captured and stored in the grant audit trail.

Where a third party is involved, the grant management application enables a three-way LOA. This embodiment allows the LOA to be electronically signed by a third party, in addition to the grant requestor and granting organization. This feature is used, for example, when a grant requestor uses a third party accreditor to accredit the program. This is common in the life science industry, specifically for smaller grant requests submitted by non-accredited institutions or even individuals.

The grant requestor supplies the email address of the individual representing the third party, who then also receives an email directing them to review and electronically sign the LOA within the system, via the web-based portal. The electronic signature of the third party, as well as those of the grant requestor and granting organization are captured and stored in the grant audit trail. The system also dynamically updates the language of the LOA to reflect a three-way agreement in these situations.

In the above described embodiments, automated communication between requestors and approvers also facilitates and expedites the review and approval processes. For example, next phases in the process are triggered by emails automatically generated by actions in a prior phase of the process. All actions are tracked in an audit log that is accessible by certain users. Users can upload additional comments in the log for actions outside the application (calls, request for information, faxes) and upload additional documents submitted during the process.

C. Administrator Module

Figure 4A:
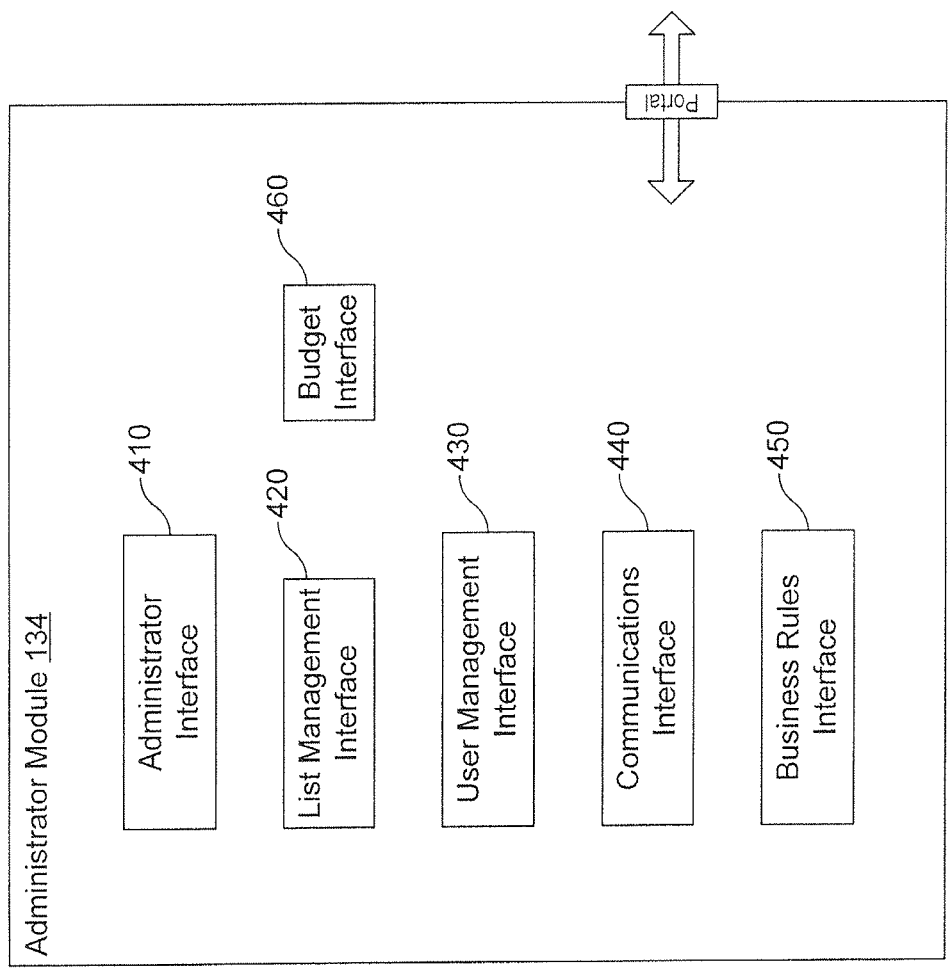

The administrator module 134 of FIG. 4A cooperates with the requestor module 132 and approver modules 136 to facilitate and direct many of the automated features in the grant management application. This is accomplished through the development of custom sets of business rules that are derived from the registration and grant information obtained and stored in the grant requestor module. The business rules allow, for example, automated database verification, internal and external user and account management, user administration maintenance, approval/review committee definition, standard management reporting, automated communication with editing capability (e.g., via auto-emails), budget entry and other tracking, document retention, and various analytical functions.

To facilitate the development of the custom set of business rules, the administrator module provides a plurality of GUIs through which various entities of the granting organization or commercial sponsor may interact with, and direct the operation of, the grant management application. For example, there are interfaces for general administration, list management (e.g., exclusion and eligibility lists), user management, communication, business rule development, and budget management. Other specific interfaces may be added as necessary. An exemplary list of interfaces is provided in Table 5 and/or illustrated in FIG. 4A.

TABLE 5

| Button Creating Coordinators/Administrators | Permission |
|---|---|
| User Management | Internal users with this role are able to create and update internal users in the GMA (Internal Users & Review Groups) |
| Exclusion Management (with User Management) | Internal users with this role are able to manage the Exclusion List |
| Requestor Profile Management (with User Management) | Internal users with this role are able to view and manage the Requestor tab |
| Grant Review Management | Internal users with this role are able to manage the different review checklists |
| Grant Planning | Internal users with this role are able |

TABLE 5-continued

| Button Creating Coordinators/Administrators | Permission |
| --- | --- |
| Management | to access each therapeutic area's Budget and Program Management |
| Business Rules Management | Internal users with this role are able to manage the business rules settings in the GMA |
| Communication Management | Internal users with this role can manage the communication templates in the GMA (emails and reminders) |

Administrator Homepage

Figure 4B:
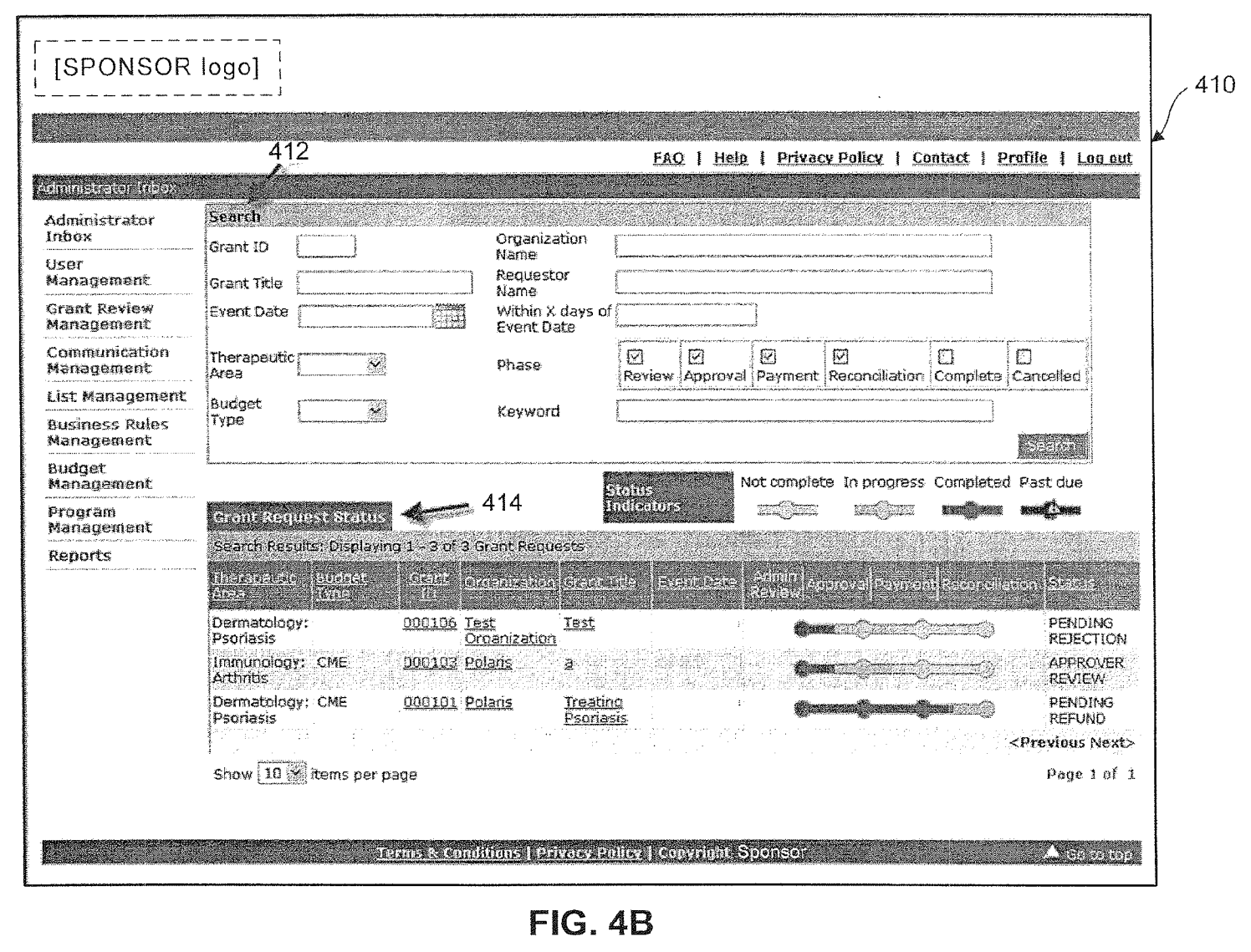

The administrator module 134 provides an administrator interface or homepage 410 from which authorized users may access the plurality of interfaces. An exemplary administrator homepage is illustrated in FIG. 4B. Administrator specific hyperlinks are available along the left side of the homepage 410. A search GUI 412 and search result GUI 414 are present as well.

From the administrator homepage, one can view at a glance the status of any grant in the grant management application. Exemplary status conditions are shown in Table 6 and/or FIG. 4B.

TABLE 6

| Status | Next Step |
| --- | --- |
| Admin Review | The Coordinator needs to route the grant or request additional information. |
| Approved | The Requestor needs to sign the LOA, and then the Admin needs to generate the AP Grant Package. |
| Approver Review | The MEGM needs to approve or reject the grant. |
| Cancelled | The grant has been routed to another Commercial supporter department. |
| Closed | The grant has been closed out. |
| Not Submitted | The Requestor needs to complete the grant request. |
| Pending Grant Closeout | The Coordinator needs to close the grant. |
| Pending Reconciliation | The Requestor needs to reconcile. |
| Pending Refund | The Requestor needs to return unused funds. |
| Pending Rejection | The Coordinator needs to notify the requestor of rejection. |
| Pending Rejection OIG | The MEGM needs to notify the requestor of rejection. |
| Refund Due | The Coordinator needs to generate the Refund Request. |
| Rejected | The grant has been rejected and the requestor has been notified. The grant is closed. |

List Management

Figure 4C:
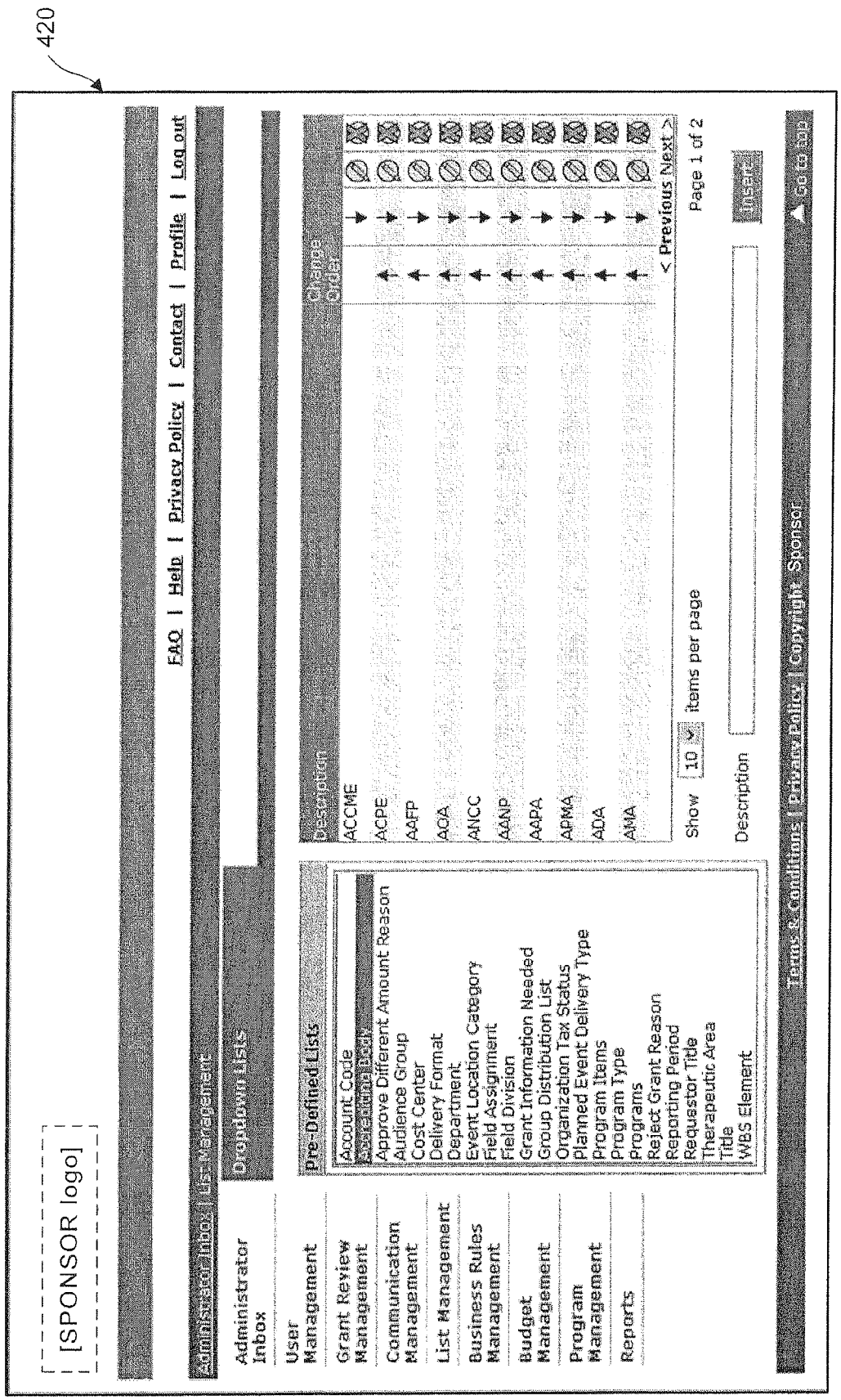

A list management interface 420 is illustrated in FIG. 4C and is one of the interfaces available from the administration homepage 410. From the list management interface 420, a user can ensure that the local compliance database 140 is kept up to date and reflects, for example, the most recent exclusion and eligibility lists. This procedure is discussed more fully below.

Exclusion Lists

To protect the health and welfare of the nation's elderly and poor, the Congress of the United States implements legislation to prevent certain individuals and businesses from participating in Federally-funded health care programs. The Office of the Inspector General ("OIG") for the Department of Health and Human Services, under this Congressional mandate, maintains a program to exclude individuals and entities affected by these various legal authorities, contained in sections 1128 and 1156 of the Social Security Act. To that end, the OIG maintains a list of all currently excluded parties called the "List of Excluded Individuals/Entities." Bases for exclusion include convictions for program-related fraud and patient abuse, licensing board actions and default on Health Education Assistance Loans.

Pharmaceutical, biotechnology and other life science companies who wish to participate in federally funded healthcare programs are precluded from providing grants to agencies in the OIG's Exclusions Database. The list management interface of the administrator module therefore facilitates the maintenance of an up-to-date eligibility list in the local compliance database by accessing the OIG's Exclusions Database at their website http://oig.hhs.gov/. This exclusion list can easily be appended to the local compliance database, which is then accessed to determine whether grant requestors are excluded from receiving a grant.

A similar exclusion database is maintained by the Food and Drug Administration. Further, exclusion lists could be maintained by other government agencies, or by the granting organization or commercial sponsor themselves in accordance with their own rules and preferences. Any such external or internal exclusion list can be appended to the local compliance database in a manner similar to that described above with respect to the OIG exclusion list.

Eligibility Lists

The Accreditation Council for Continuing Medical Education ("ACCME") identifies, develops, and promotes standards for quality for continuing medical education (CME) used by physicians in their maintenance of competence and incorporation of new knowledge. The ACCME pursues its mission through a voluntary self-regulated system for accrediting CME providers. It also provides a peer-review process responsive to changes in medical education and the health care delivery system. Individual states also may have separate accreditation programs.

Pharmaceutical, biotechnology and other life science companies who wish to fund CME programs through grants will typically only provide grants to those CME providers that are accredited by the ACCME and the applicable state. The ACCME maintains on its publicly accessible website a list of such accredited CME providers.

In an embodiment, the list management interface 420 of the administrator module facilitates the maintenance of an up-to-date eligibility list by accessing the ACCME website at http://www.accme.org/. Therein, the ACCME maintains a link to a List of Accredited Providers that includes both ACCME and State Accredited provider lists in Excel format. This list can easily be appended to the local compliance database and accessed to determine the eligibility of grant requestors seeking a CME grant.

501c3 Eligibility List

The grant management application can also be adapted to facilitate and manage charitable grants. In view of this feature, an additional eligibility list from the IRS can be appended to the local compliance database 140. As described above with respect to the OIG exclusion list and the ACCME accreditation list, the list management interface of the administrator module facilitates the maintenance of an up-to-date list of eligible charities as determined by its IRS tax status. Such a list is maintained by the IRS on its website at http:// www.irs.gov. Therein is a link to Charities & Non-Profits that contains a list of 501c3 organizations. This list can be easily appended to the local compliance database.

In sum, through the list management interface 420, the grant management application maintains a local compliance database 140 that includes up-to-date exclusion and eligibility lists. Through these databases—e.g., the OIG, ACCME, and IRS lists—the grant management application helps the granting organization or commercial sponsor ensure that no unauthorized entities receives grants to which they are either excluded or ineligible.

Business Rules Engine

Figure 4D:
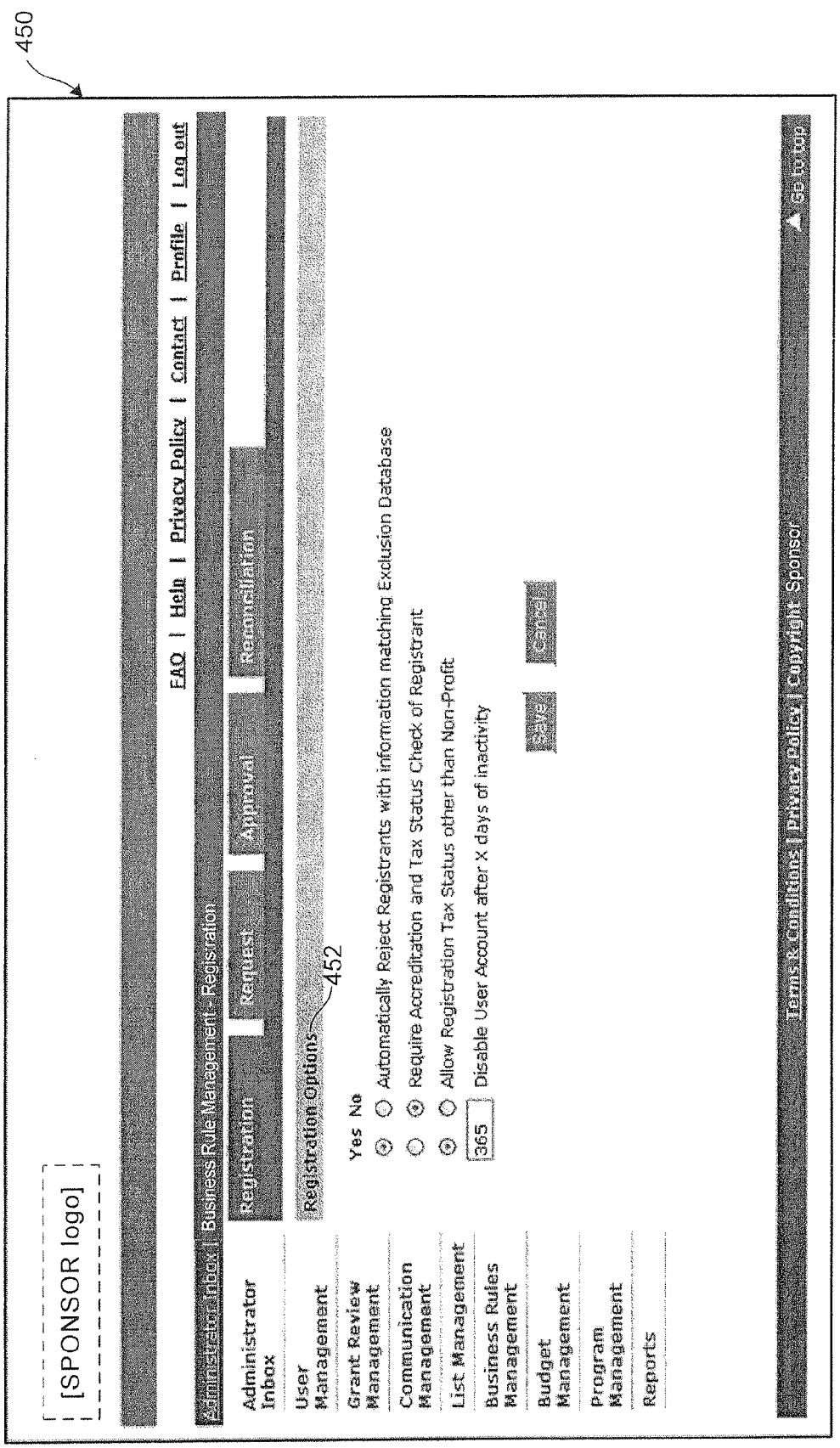

The administration module includes a business rules interface 450, as illustrated in FIG. 4D. The business rule GUI allows the grant management application administrators— i.e., the granting organization or sponsor—to dynamically set parameters for automated database verification, internal and external user and account management, user administration/ roster maintenance, approval/review committee definition, standard management reporting, automated communication with editing capability (e.g., via auto-emails), budget entry and tracking, document retention, and various analytical and reporting functions. A custom set of business rules may be generated based on the registration and grant information received and stored in the grant requestor module 132. Once a set of custom business rules has been developed for a particular grant application, then the administration module 134 coordinates the operation of the grant requestor module 132 and grant approver module 136 to efficiently and effectively manage the requested grant through its entire lifecycle. A description of exemplary business rules is provided below.

Registration Options

An exemplary business rule GUI 450 is illustrated in FIG. 4D for a business rule related to grant requestor registration. As illustrated, a number of registration options 452 are available. For example, an administrator may choose whether to enable an automatic rejection if the grant requestor is included in the exclusion list in the local compliance database 140. Similarly, another available option enables the administrator to elect a tax status check. Whether these options are used depends on the grant information and registration information in a user's on-line profile. Default parameters are automatically set, but the administrator has the option to change them as necessary.

Other business rules follow and are similarly implemented. In the embodiment depicted in FIG. 4D, other business rules may be developed for the request, approval and reconciliation phases of the grant application process, as indicated by the tabs on the business rules GUI 450. Additional generic areas for business rules may be developed as applicable.

Grant Timing

It typically takes a finite amount of time to process requests for grant funding. In the life science industry, for example, granting agencies typically require as much as 45 days to fully process a grant request. As such, a business rule can be turned on whereby grants can not be accepted within 45 days of the start date. Any grant request with a desired start date inside the 45 day window would be automatically rejected or queued for separate or later review. This dynamic business rule can be instantly changed by an administrator through the business rules interface 450 in the administrator module 134. The grant requestor would be informed of the decision via the grant requestor module 132 and the web-based portal.

Required Documents

The number and types of documents required to be uploaded during the grant application process can vary widely depending on the type and size of grant sought. As such, a business rule can be developed whereby a certain set of documents must be uploaded if the grant has a certain profile (dollar volume, type of grant etc). The grant requestor would be informed of the necessary documents and their completion status via the grant requestor module and the web-based portal.

Similarly, the required documentation may be driven by government rule or regulation. For example, a U.S. Senate subcommittee recently requested documentation for all CME programs funded by pharmaceutical companies over the last 12 months for the purpose of determining whether additional oversight of CME grants is necessary in this area. A business rule could be dynamically implemented to ensure all required documents requested by the U.S. Senate subcommittee are submitted with a grant application.

Budget Management.

The grant management application contains multiple options for budget categories. A variety of business rules can be developed to help to manage grant budgets. For example, a business rule can determine the required budget information the grant requestor must submit to the granting organization or commercial sponsor based on budget size. The grant requestor would be informed of the necessary documents and their completion status via the grant requestor module and the web-based portal. In another embodiment, a business rule could be derived that prevents payment of any grant above the budgeted amount.

In another embodiment, the administrator module allows a business rule to be created that requires budgets to be reconciled within a certain time period after the completion of the grant activities. The business rule would automatically email the recipient to upload the necessary actual budget information. If the information is not uploaded within a certain time period after the grant event, the recipient will be excluded from submitting additional grant requests.

In yet another embodiment, payments to grant requestors may be based on certain milestones. For example, pharmaceutical grants are sometimes paid over multiple periods extending over several years, and funding may be released as certain milestones (e.g., dates or deliverables) have been reached. The business rule interface in the administration module allows for the setting of these milestones, progress reporting and triggering email notifications to identify whether or when a milestone has been reached. When a milestone is reached, supporting documents and other data may be uploaded and payments can be released. This feature is specifically useful for IIRP grants. In an alternate embodiment, the grant management application may include a self contained budget interface that allows the administrators to generate their own budgets and book grant approvals against these budgets.

Figure 4E:
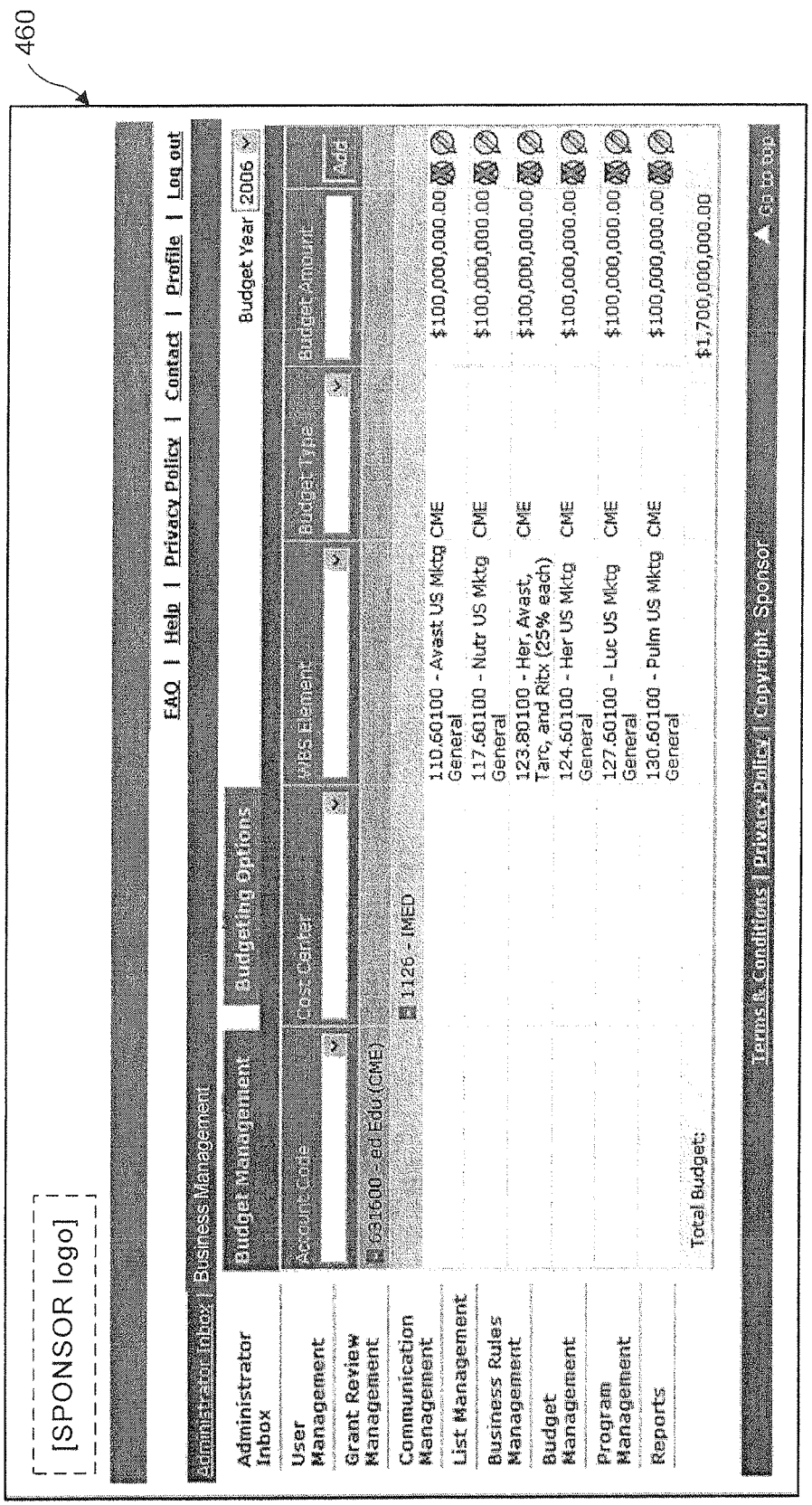

An exemplary budget interface 460 is illustrated in FIG. 4E. Such a budget GUI increases flexibility of budgeting, allowing budgets to be more detailed than the enterprise-wide accounting system allows. This flexibility would allow joint budget codes to be shared, for example, between therapeutic areas. Budget interface 460 could also include an optional interface with enterprise resource planning from, for example, SAP or other financial reporting systems. Alternatively, the grant management application could use a proprietary accounting module.

Grant Reconciliation

The number of days required to reconcile a grant is a dynamic field that the administrator can change to require requestors to upload financial and operational information within a certain number of days after the event has occurred. Requestors will not be able to upload additional grant requests before the reconciliation has been completed. In the case of unused funds after a reconciliation, the application may automatically determine whether it will send a request for refund to the requesting organization. The request of refund is typically based on remaining amount as part of the overall budget amount and/or remaining amount in absolute terms (i.e., >$250).

Grant Tracking and Analysis

It is increasingly important and desirable for pharmaceutical companies to conduct outcomes-based research, which entails identification of the effectiveness of the grant program on physician behavior and consequently patient impact of the program. Grant recipients may therefore be required to conduct research on the effectiveness of the grant, and may be required to upload the summary of the findings after the event has occurred. The administration module provides standard templates on requesting, collecting and analyzing this research on effectiveness, and uploading the findings into the application for future research and comparison.

In support, requestors can be required to upload information about the completion of the grant program after the event date. Information required can include, for example, a "Balanced Score Card" review of the program and the organization handling the accreditation and logistics of the program. Additionally, a financial and/or an operational reconciliation could be required.

For further analysis, grants may also be benchmarked to historical budgets and similar grant requests. In an embodiment, a business rule may be developed to compute expenses that are submitted for events and compares these against past expenses that have been submitted for similar grant types. An administrator can be automatically notified if the expenses are out of range by a certain amount or percentage. For example, the business rule may use ratios to compare program costs per speaker or per attendee for an event to make the financials comparable.

Communication and Content Templates

Figure 4F:
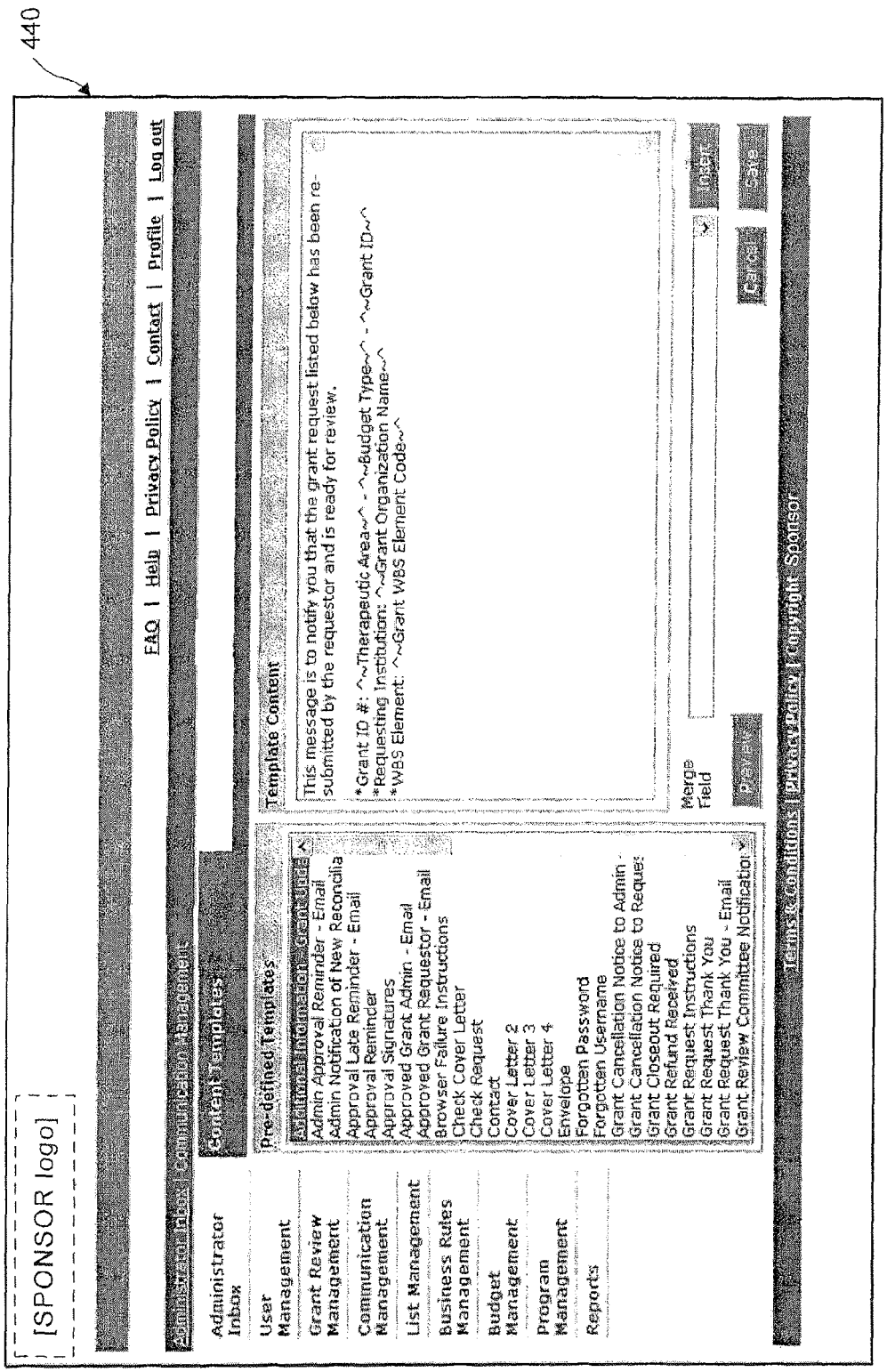

The administration module 134 also provides an interface for generating communication templates based on the grant information and registration information in the on-line user profile. A template content GUI 440 is illustrated in FIG. 4F. The communication templates provide standardized content for automated email communication between a grant requestor and a granting organization or commercial sponsor via the web-based portal. Additionally, the communication templates may be locally modifiable by authorized users. Exemplary templates are shown in Table 7.

TABLE 7

Emails sent by GMA

| Template | Function | Recipient |
|---|---|---|
| Additional Information - Grant Updated | When a Requestor submits additional information through the system by updating the Grant Request in response to the "Please submit additional information" flag on the Requestor Home Page | Coordinator |
| Admin Notification of New Reconciliation | When a Requestor submits a Reconciliation for a Grant | Coordinator |
| Approval Notification Letter to Requestor | When a Grant is approved | Requestor |
| Approved Grant Admin | When a Grant is approved | Coordinator |

TABLE 7-continued

Emails sent by GMA

| Template | Function | Recipient |
|---|---|---|
| Approved Grant Requestor | When a Grant is approved | Requestor |
| Approver Notification | When a Grant is routed/re-routed to a MEGM | MEGM |
| Forgotten Password | When a user requests forgotten password | Commercial supporter User or Requestor |
| Forgotten Username | When a user requests forgotten username | Commercial supporter User or Requestor |
| Grant Cancellation Notice to Admin | When a Grant Request is cancelled | Coordinator |
| Grant Cancellation Notice to Requestor | When a Grant Request is cancelled | Requestor |
| Grant Request Thank You | When a Grant Request is submitted successfully | Requestor |
| Grant Review Committee Notification | When a Grant is assigned to a Grant Review Committee | Each member of the Grant Review Committee |
| Information Request | When a Coordinator would like to request additional information from a Requestor | Requestor |
| LOA Accepted | When a Requestor submits an LOA | Coordinator |
| Reason for unused funds | When a Requestor submits a reason for unused funds not being returned | Coordinator |
| Refund Request | When a Refund Request is generated by the Coordinator from the Grant History screen | Requestor |
| Registration Confirmation | When a Registration is approved | Requestor |
| Reject Grant - Approval Denied | When a Grant Request is rejected | Coordinator |
| Reject Grant | When a Grant Request is rejected | Requestor |
| Reset Password - Internal Users | When a Commercial supporter user's password is reset by the Administrator | Internal users |
| Reset Password - Requestor | When a Requestor's password is reset by the Administrator | Requestor |
| Temporary Password - New Account | New Coordinators, MEGMs, and GRC Members will receive this email when the Coordinator sets up a new account for them | Internal users |
| Templates 1-10 | Additional email templates | TBD |

In addition to communication templates, the administration module also provides an interface for generating system content templates based on the grant information and registration information. The system content templates provide standardized GUIs to ensure grant requestors effectively communicate with granting organization or commercial sponsor via the web-based portal. The communication and content templates are used to ensure standardized implementation of the custom set of business rules as well as a standardized look and feel to the overall grant management application.

CME Specific Business Rules

Continuing medical education (CME) grants represent a large share of the grants provided by pharmaceutical and other life science companies. The administrator module 134 therefore enables a variety of CME specific business rules and features. For example, grant information for CME grants can be classified by both therapeutic area and a geographic location where the CME grant is to be accomplished. With this information, a calendar of events pertaining to approved CME grant activity can be maintained at the web-based portal. The calendar is made available to third-party health care providers interested in attending the CME activity. Such a feature enhances attendance at the CME and thus effectiveness of the CME grant, essentially allowing the granting organization or commercial sponsor to get more value from the CME grant.

In a similar embodiment, CME grant information may be tracked by geographic region and size of grant to determine, on a geographic basis, the amount budgeted and spent in a particular region. This information allows the granting organization or commercial sponsor such as a pharmaceutical company promoting a new drug to decide how to best allocate future CME funds to achieve the most effective coverage.

In yet another embodiment, for completed CME grants, external feedback information from the grant requestor regarding CME grant outcomes may be obtained. This information could include, for example, the level of success in accomplishing grant objectives and the degree to which budget estimates were met. This information could be combined with internal feedback information from the granting organization or commercial sponsor regarding CME grant outcomes, including cost of CME grant management. Then, based on both the external and internal feedback, a balanced scorecard for the grant requestor may be derived that reflects an overall value of the CME grant to the granting organization or commercial sponsor. Such information could be used in deciding whether to grant future requests from repeat CME grant requestors.

Integration with Existing Systems

The grant management application can interface with existing financial, authentication, reporting, or other systems (such as an external event calendar) through the administrator module. These interfaces can be accomplished through a variety of architectures, including file transfer, XML feeds, or more advanced methods such as remote API calls or third party connectors. Due to the hosted nature of the system, as well as the specifics of each client's existing systems, there is typically no need for out-of-the-box data/system interface functionality. However, one skilled in the art could develop a plurality of interfaces from the grant management application to, for example, SAP, XML feeds for budgeting or calendar applications, file transfer interfaces for data retention, as well as developing other types of interfaces between similar systems.

Exemplary Method

FIGS. 5A-B illustrate an exemplary method implementing the above described grant management application. According to step 510, a web-based portal receives registration information pertaining to a grant requestor. As illustrated above, such registration information relates to the grant requestor or applicant and includes information such as the organization's legal name, tax ID and status, contact information and the like. According to step 515, a local compliance database is maintained that includes an exclusion list of grant requestors that have been excluded from receiving a grant. The local compliance is maintained in computer readable form.

Using the local compliance database, the grant requestors exclusion status is determined by comparing the registration information to the exclusion list as illustrated in step 520. The grant requestor is then informed of its exclusion status via the web-based portal, in accordance with step 525. If the grant requestor exclusion test is satisfactory—e.g., if the grant requestor is not on the exclusion list in the local compliance database—then the web-based portal may receive grant information pertaining to the grant sought, as illustrated in step 530.

Finally, according to step 535, a custom set of business rules is derived based on the grant information and the registration information. The custom set of business rules automatically manages the receipt, review, tracking, reconciliation and analysis of the grant sought. Furthermore, the business rules are implemented by the grant management application via a web-based portal coupled thereto. In this fashion, and as described more fully above, the grant requestor/grantee, granting organization or commercial sponsor and authorized third-parties can navigate the grant process in view of various industry specific government mandated requirements and regulations, as well as required internal processes and policies.

FIG. 5B illustrates a further embodiment wherein, according to step 517, an eligibility list is also maintained in the local compliance database. The eligibility list contains a list of grant requestors that are eligible to receive the type of grant sought. In addition to the exclusion check, and in accordance with step 522, the grant management application also determines an eligibility status for the grant requestor. This is accomplished by comparing the grant information to the eligibility list. The grant requestor is informed of its eligibility status via the web-based portal, as illustrated in step 527. If the eligibility status is also satisfactory—e.g., the grant requestor is included in the eligibility list for the type of grant sought—then the exemplary method proceeds to step 535. As discussed above, step 535 derives a custom set of business rules to automatically manage the receipt, review, tracking, reconciliation and analysis of the grant sought.

Example Computer System Implementation

Various aspects of the present invention can be implemented by software, firmware, hardware, or a combination thereof. FIG. 6 illustrates an example computer system 600 in which the grant management application, or portions thereof, can be implemented as computer-readable code. For example, the method illustrated by flowchart of FIG. 5 can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose processor like a graphic processing unit (GPU) or a general purpose central processing unit (CPU). Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612 and/or a removable storage drive 614, and a memory cache 616.

Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data. In an embodiment, the secondary memory 610 could be dedicated graphics memory for storing images and associated image information, texture data and the like. For example, a portion of the secondary memory 610 such as memory cache 616 could be used for storing previously received images and image information from a content provider.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, a hard disk installed in hard disk drive 612, and signals carried over communications path 626. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the method illustrated by flowchart of FIG. 5 discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer products comprising software stored on any computer useable medium. Such software, when executed in one or more data processing devices, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, Nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A web-based grant management system, comprising:
a web-based portal;
an application server coupled to the web-based portal and configured to manage a grant, the application server including:
a database module configured to access a local compliance database including a computer-readable eligibility list of grant requesters;
a requester module configured to enable grant requestors to enter registration information, grant requests and grant information, manage grant requests, and monitor grant status;
an approver module configured to enable grant approvers to track grant requests and manage approval decisions; and
an administrator module configured to enable automated communication between grant approvers and grant requestors via the web-based portal, wherein the administrator module automatically determines an eligibility status of the grant requestor by comparing grant information to the eligibility list, informs a grant requestor of its eligibility status via the web-based portal, and makes an automated determination of custom business rules to automatically manage the grant sought when the eligibility status is satisfactory, or terminates the grant request if the eligibility status is unsatisfactory; and
a communication system coupled to the application server configured to enable the communication between grant approvers and grant requestors via the web-based portal, and with a plurality of external databases in order to maintain the local compliance database.

2. The system of claim 1, wherein the web-based portal is an independent Investigator-Study (IIS) portal.

3. The system of claim 1, wherein the web-based portal is a Health Care Professional Interaction Port (HIP) portal.

4. The system of claim 1, wherein the web-based portal is a Spend Tracking and Analytics (STAR) portal.

5. The system of claim 4, wherein the database module is further configured to:
access a web-based eligibility database; and
download information from the web-based eligibility database to the eligibility list in the local compliance database.

6. The system of claim 4, wherein the web-based eligibility database is an accreditation database maintained by the Accreditation Council for Continuing Medical Education (ACCME®).

7. The system of claim 4, wherein the web-based eligibility database is a tax status database maintained by the United States Internal Revenue Service.

8. The system of claim 1, wherein the local compliance database further includes a computer readable list of excluded grant requestors and the administrator module is further configured to enable automated compliance database verification by making an initial determination of whether a grant requestor is an excluded grant requestors prior to proceeding with a grant request and by denying submission of grant information pertaining to a grant sought for an excluded grant requestor.

9. The system of claim 8, wherein the database module is further configured to:
   access a web-based exclusion database; and
   download information from the web-based exclusion database to the exclusion list in the local compliance database.

10. The system of claim 9, wherein the web-based exclusion database is a U.S. government sponsored exclusion database maintained by the United States Department of Health and Human Service, Office of Inspector General (OIG).

11. The system of claim 9, wherein the web-based exclusion database is a U.S. government sponsored exclusion database maintained by the United States Food and Drug Administration.

12. The system of claim 1 wherein the administration module is further configured to automatically perform, prior to a final grant approval decision, a first eligibility status verification on the grant requestor based on an updated version of the eligibility list and final grant approval only occurs for an eligible requestor.

13. The system of claim 12, wherein the administration module is further configured to automatically perform, prior to initiating payment on an approved grant, a second eligibility status verification on the grant requestor based on the local compliance database and payment for an approved grant only occurs for an eligible requestor.

14. One or more non-transitory computer-readable media having computer-executable instructions thereon that, when executed by a computer, perform a method comprising the acts of:
   receiving at a web-based portal computer-readable registration information pertaining to a grant requestor, thereby initiating a grant request;
   receiving at the web-based portal computer-readable grant information;
   maintaining in computer-readable form a local compliance database that includes a computer readable eligibility list of grant requestors that are eligible to receive the grant sought;
   automatically determining an eligibility status of the grant requestor by comparing the grant information to the eligibility list, wherein the determination is made by a grant management application coupled to the web-based portal;
   informing the grant requestor of its eligibility status via the web-based portal;
   when the eligibility status is satisfactory, based on the computer-readable grant information and the computer readable registration information, deriving a custom set of business rules to automatically manage the grant sought, wherein the business rules are implemented by the grant management application; and
   when the eligibility status is unsatisfactory, then terminating the grant request.

15. The non-transitory computer-readable media of claim 14, wherein the web-based portal is an Independent Investigator-Study (IIS) portal.

16. The non-transitory computer-readable media of claim 14, wherein the web-based portal is a Health Care Professional Interaction Port (HIP) portal.

17. The non-transitory computer-readable media of claim 14, wherein the web-based portal is a Spend Tracking and Analytics (STAR) portal.

18. The non-transitory computer-readable media of claim 14, wherein the method further comprises the acts of: accessing a web-based eligibility database; and downloading information from the web-based eligibility database to the eligibility list in the local compliance database.

19. The non-transitory compute readable media of claim 18, wherein the web-based eligibility database is an accreditation database maintained by the Accreditation Council for Continuing Medical Education (ACCME®).

20. The non-transitory computer-readable media of claim 18, wherein the web-based eligibility database is a tax status database maintained by the United States Internal Revenue Service.

21. The non-transitory computer-readable media of claim 14, wherein the method further comprises the act of: prior to a final grant approval decision, automatically performing a first eligibility status verification on the grant requestor based on an updated version of the eligibility list, wherein the first eligibility status verification is made by the grant management application and final grant approval only occurs for an eligible requestor.

22. The non-transitory computer-readable media of claim 21, wherein the method further comprises the act of: prior to initiating payment on an approved grant, automatically performing a second eligibility verification on the grant requestor based on the local compliance database, wherein the second eligibility status verification is made by the grant management application and payment for an approved grant only occurs for an eligible requestor.

23. A web-based grant management method that enables a granting organization or commercial sponsor to manage life science grants, the method comprising the steps of:
   receiving at a web-based portal computer-readable registration information pertaining to a grant requestor, thereby initiating a request for a grant;
   receiving at the web-based portal computer-readable grant information;
   maintaining in computer-readable form a local compliance database that includes a computer-readable eligibility list of grant requestors that are eligible to receive the grant;
   automatically determining an eligibility status of the grant requestor by comparing the grant information to the eligibility list, wherein the determination is made by a grant management application coupled to the web portal;
   informing the gram requestor of its eligibility status via the web-based portal;
   when the eligibility status is satisfactory, based on the computer-readable grant information and the computer readable registration information, deriving a custom set of business rules to automatically manage the grant, wherein the business rules are implemented by the grant management application; and
   when the eligibility status is unsatisfactory, then terminating the request for a grant.

24. The method of claim 23, wherein the web-based portal is Independent Investigator-Study (IIS) portal.

25. The method of claim 23, wherein the web-based portal is a Health Care Professional Interaction Port (HIP) portal.

26. The method of claim 23, wherein the web-based portal is a Spend Tracking and Analytics (STAR) portal.

27. The method of claim 23, wherein the method further comprises the acts of: accessing a web-based eligibility database; and downloading information from the web-based eligibility database to the eligibility list in the local compliance database.

28. The method of claim 27, wherein the web-based eligibility database is an accreditation database maintained by the Accreditation Council for Continuing Medical Education (ACCME®).

29. The method of claim 27, wherein the web-based eligibility database is a tax status database maintained by the United States Internal Revenue Service.

30. The method of claim 23, further comprising the act of: prior to a final grant approval decision, automatically performing a first eligibility status verification on the grant requestor based on an updated version of the eligibility list, wherein the first eligibility status verification is made by the grant management application and final grant approval only occurs for an eligible requestor.

31. The method of claim 30, further comprising the act of: prior to initiating payment on an approved gram, automatically performing a second eligibility verification on the grant requestor based on the local compliance database, wherein the second eligibility status verification is made by the grant management application and payment for an approved grant only occurs for an eligible requestor.

* * * * *